United States Patent
Min et al.

(10) Patent No.: US 9,952,640 B2
(45) Date of Patent: Apr. 24, 2018

(54) POWER CONTROL SYSTEM

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Jie Min, Wuhan (CN); Chun-Sheng Chen, New Taipei (TW)

(73) Assignees: HONG FU JIN PRECISION INDUSTRY (WuHan) CO., I, Wuhan (CN); HON HAI PRECISION INDUSTRY CO., LTD., New Taipei (TW)

(*) Notice: Subject to any disclaimer, the term of this patent is extended or adjusted under 35 U.S.C. 154(b) by 18 days.

(21) Appl. No.: 15/248,926

(22) Filed: Aug. 26, 2016

(65) Prior Publication Data
US 2018/0032115 A1 Feb. 1, 2018

(30) Foreign Application Priority Data
Jul. 29, 2016 (CN) .......................... 2016 1 0610241

(51) Int. Cl.
*G06F 1/26* (2006.01)
(52) U.S. Cl.
CPC ................ *G06F 1/26* (2013.01); *G06F 1/263* (2013.01); *G06F 1/266* (2013.01)

(58) Field of Classification Search
CPC ............ G06F 1/26; G06F 1/263; G06F 1/266
See application file for complete search history.

(56) References Cited

U.S. PATENT DOCUMENTS

| | | | |
|---|---|---|---|
| 2004/0003304 A1* | 1/2004 | Kobayashi | G06F 1/266 713/300 |
| 2006/0149976 A1* | 7/2006 | Vaserfirer | G06F 1/266 713/300 |
| 2016/0109917 A1* | 4/2016 | Sasagawa | G06F 1/266 713/310 |
| 2016/0126757 A1* | 5/2016 | Hirosawa | G06F 1/1632 307/20 |

* cited by examiner

*Primary Examiner* — Stefan Stoynov
(74) *Attorney, Agent, or Firm* — ScienBiziP, P.C.

(57) ABSTRACT

A power control system allowing multiple voltage levels from a single power adaptor includes a power supply device and an electronic device. The power supply device includes a power supply and a first power controller. The power supply is configured to supply power for a graphics card as an external renderer, and the first power controller is configured to output a voltage signal. The electronic device includes a second power controller electrically coupled to the first power controller and the second power controller is configured for obtaining the voltage signal from the first power controller. The first power controller can output a first voltage or a second voltage to the second power controller to supply power for the electronic device.

19 Claims, 5 Drawing Sheets

POWER CONTROL SYSTEM

FIELD

The subject matter herein generally relates to power control system.

BACKGROUND

In a computer system, when using external graphics in a notebook for graphics performance ascension, users need two power adapters configured to supply power for the external graphics renderer and for the notebook computer.

BRIEF DESCRIPTION OF THE DRAWINGS

Implementations of the present technology will now be described, by way of example only, with reference to the attached figures.

DETAILED DESCRIPTION

Figure 1:
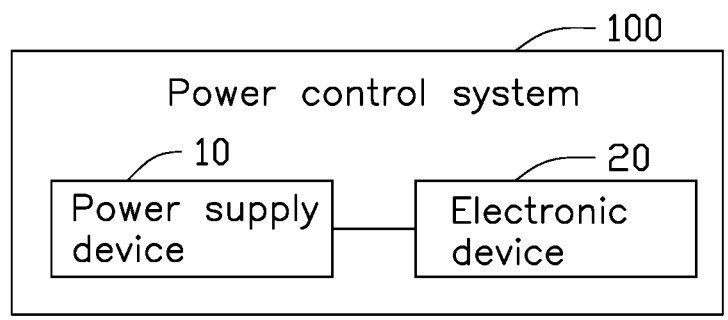
FIG. 1 is a block diagram of an embodiment of a power control system, the power control system including a power supply device and an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. It should be noted that references to "an" or "one" embodiment in this disclosure are not necessarily to the same embodiment, and such references mean "at least one". However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

FIG. 1 illustrates a power control system 100 of an embodiment of the present disclosure.

The power control system 100 can comprise a power supply device 10 and an electronic device 20. The power supply device 10 is electrically coupled to the electronic device 20 to supply power for the electronic device 20.

In at least one embodiment, the electronic device 20 can be a notebook computer.

Figure 2:
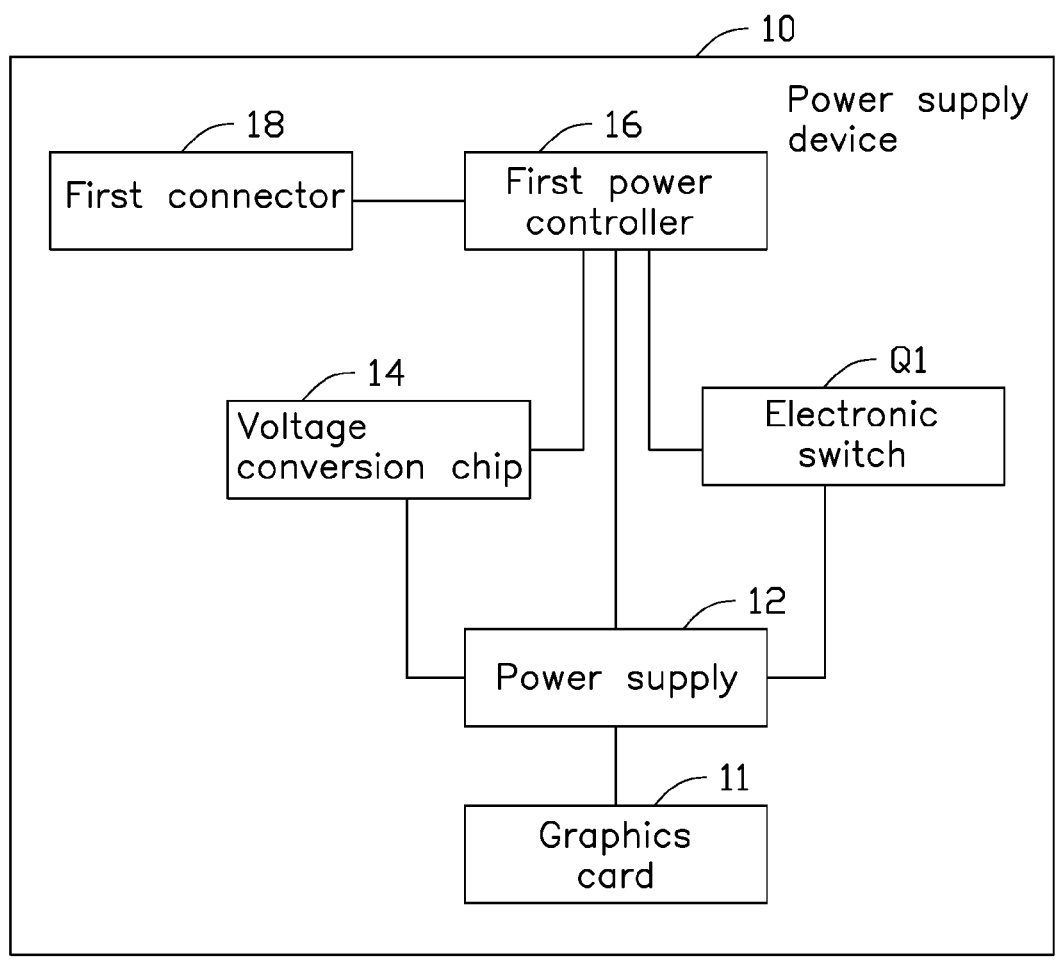
FIG. 2 is a block diagram of an embodiment of the power supply device of FIG. 1.

FIG. 2 illustrates an embodiment of the power supply device 10. The power supply device 10 can comprise a power supply 12, a voltage conversion chip 14, a first power controller 16, a first connector 18, and an electronic switch Q1.

The power supply 12 is electrically coupled to a graphics card 11 to supply power for the graphics card 11. The power supply 12 is also electrically coupled to an alternating current (AC) power supply 30. The power supply 12 obtains an AC power from the AC power supply 30, and outputs a 5V voltage to the first power controller 16. In at least one embodiment, the power supply 12 can be an advanced technology extended (ATX) power supply.

The first power controller 16 obtains the 5V voltage from the power supply 12, and outputs the 5V voltage to the first connector 18.

Both the voltage conversion chip 14 and the electronic switch Q1 are electrically coupled between the power supply 12 and the first power controller 16. The electronic switch Q1 is configured to output a power control signal to the power supply 12, to control the power supply 12 to output a 12V voltage to the conversion chip 14 and the first power controller 16.

The voltage conversion chip 14 converts the 12V voltage from the power supply 12 to 19 volts, and outputs the 19V voltage to the first power controller 16.

Figure 3:
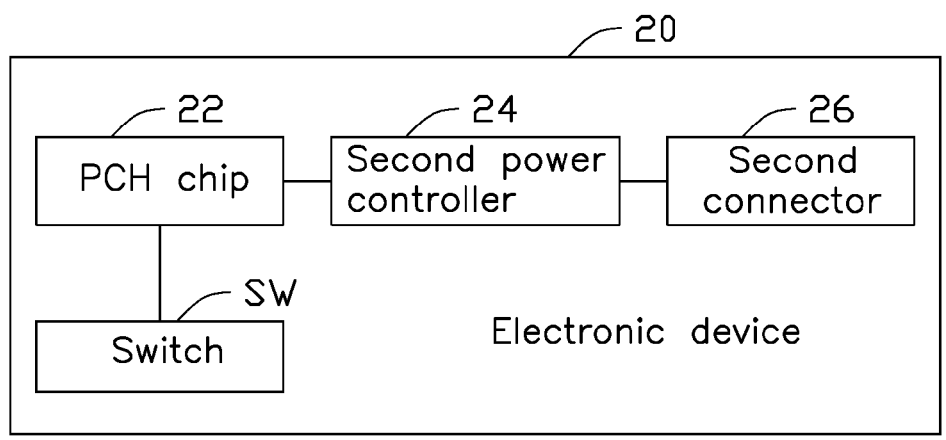
FIG. 3 is a block diagram of another embodiment of the electronic device of FIG. 1.

FIG. 3 illustrates an embodiment of the electronic device 10. The electronic device 10 can comprise a platform controller hub (PCH) chip 22, a second power controller 24, a second connector, and a switch SW.

The second connector 26 obtains the 5V voltage from the first connector 18, and outputs the 5V voltage to the second power controller 24. In at least one embodiment, both the first connector 18 and the second connector 26 can be a Type-C connector.

When the second power controller 24 obtains the 5V voltage from the first power controller 16, the first power controller 16 communicates with the second power controller 24. Under a communication protocol, the first power controller 16 is a host device and the second power controller 24 is a slave device, and the power supply device 10 can supply power for the electronic device 10.

The switch SW is electrically coupled to the PCH chip 22 to output a switch control signal to the PCH chip 22.

The PCH chip 22 obtains the switch control signal from the switch SW, and outputs a boot control signal to the second power controller 24.

The second power controller 24 outputs a power request signal to the first power controller 16 according to the boot control signal outputted by the PCH chip 22. The first power controller 16 controls the power supply 12 to output a 12V voltage to the voltage conversion chip 14 and the first power controller 16. The voltage conversion chip 14 converts the 12V voltage to a 19V voltage, and transmits the 19V voltage to the first power controller 16.

The first power controller 16 outputs a 12V voltage or a 19V voltage to the second power controller 24 according to the communication protocol.

The second power controller 24 obtains the 12V voltage or the 19V voltage from the first power controller 16 and supplies power for the electronic device 20.

Figure 4:
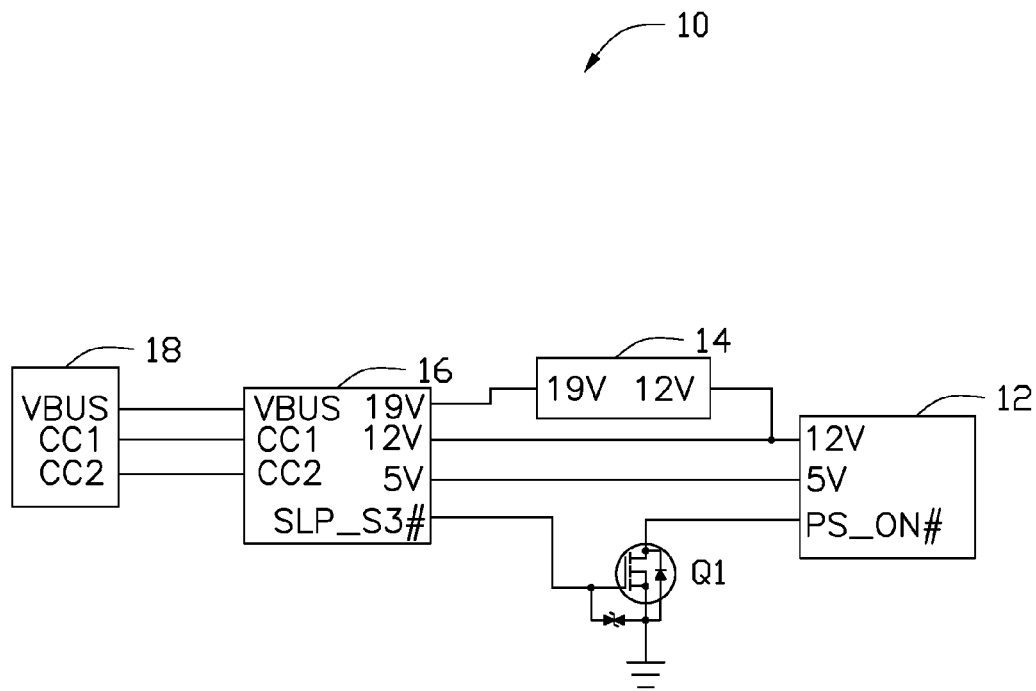
FIG. 4 is a circuit diagram of the power supply device of FIG. 1.

FIG. 4 illustrates a circuit diagram of an embodiment of the power supply device 10.

A power supply first voltage pin 12V is electrically coupled to a first power controller first voltage pin 12V. A power supply second voltage pin 5V is electrically coupled to a first power controller second voltage pin 5V. The power supply first voltage pin 12V is also electrically coupled to a voltage conversion chip voltage input pin 12V. A voltage conversion chip voltage output pin 19V is electrically coupled to a first power controller third voltage pin 19V.

A power supply power signal pin PS_ON# is electrically coupled to an electronic switch first terminal. An electronic switch second terminal is grounded. An electronic switch third terminal is electrically coupled to a first power controller signal output pin SLP_S3#. A first power controller voltage output pin VBUS is electrically coupled to a first connector power pin VBUS. Two first power controller communication pins CC1 and CC2 are electrically coupled respectively to two first connector communication pins CC1 and CC2.

Figure 5:
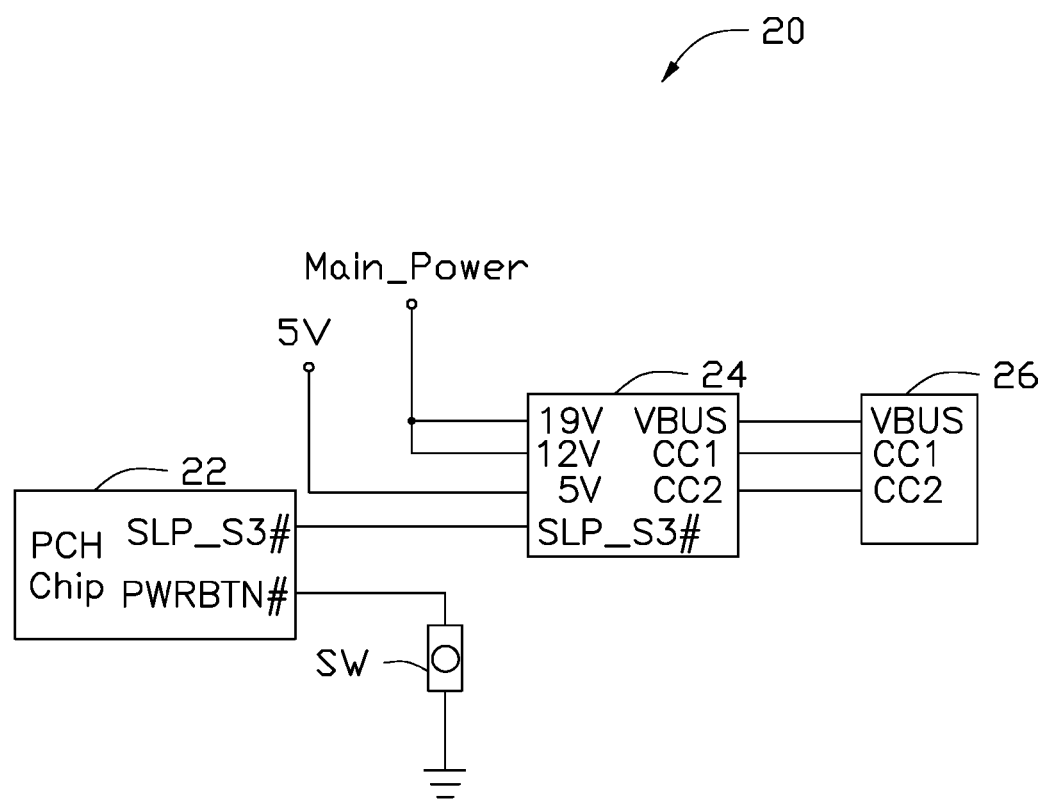
FIG. 5 is a circuit diagram of the electronic device of FIG. 1.

FIG. 5 illustrates a circuit diagram of an embodiment of the electronic device 20.

A switch first terminal is grounded, a switch second terminal is electrically coupled to a PCH chip switch control pin PWRBTN#. A PCH chip boot control pin SLP_S3# is electrically coupled to a second power controller boot control pin SLP_S3#.

A second power controller first voltage pin 5V is electrically coupled to an electronic device auxiliary power supply terminal 5V. Both a second power controller second voltage pin 12V and a second power controller third voltage pin 19V are electrically coupled to an electronic device main power supply terminal Main_Power. A second power controller voltage receive pin VBUS is electrically coupled to a second connector power pin VBUS. Two second power controller communication pins CC1 and CC2 are electrically coupled respectively to two second connector communication pins CC1 and CC2.

When the first connector 18 is connected to the second connector 26, the first connector power pin VBUS is electrically coupled to the second connector power pin VBUS. The two first connector communication pins CC1 and CC2 are also electrically coupled to the two second connector communication pins CC1 and CC2.

In at least one embodiment, the electronic switch Q1 can be a field effect transistor (FET). The electronic switch first terminal can be a FET drain. The electronic switch second terminal can be a FET source. The electronic switch third terminal can be a FET gate.

In use, the power supply 12 outputs the 5V voltage to the first power controller 16, and the first power controller 16 transmits the 5V voltage to the second power controller 24 through the first connector 18 and the second connector 26. When the second power controller 24 receives the 5V voltage from the first power controller 16, the first power controller 16 communicates with the second power controller 24, and the power supply device 10 can supply power for the electronic device 10. In the meantime, the second power controller 24 outputs the 5V voltage to the electronic device auxiliary power supply terminal 5V.

When the switch SW is pressed, the switch SW outputs the switch control signal to the PCH chip 22. The PCH chip 22 outputs the boot control signal to the second power controller 24. The second power controller 24 outputs the power request signal to the first power controller 16. The first power controller 16 outputs a trigger signal at the high-voltage level to turn on the electronic switch Q1, and the electronic switch Q1 outputs a power control signal at the low-voltage level to the power supply power signal pin PS_ON#. The power supply 12 outputs the 12V voltage to the first power controller 16 and the voltage conversion chip 14. The voltage conversion chip 14 converts the 12V voltage to a 19V voltage, and transmits the 19V voltage to the first power controller 16. The first power controller 16 outputs the 12V voltage or the 19V voltage to the second power controller 24. Thus, the second power controller 24 can output the 12V voltage or the 19V voltage to the electronic device main power supply terminal Main_Power to supply power for the electronic device 20.

The embodiments shown and described above are only examples. Many details are often found in the art such as the other features of power control system. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A power control system comprising:
   a power supply device comprising:
      a power supply configured to supply power for a graphics card; and
      a first power controller configured to output a voltage signal; and
   an electronic device comprising:
      a second power controller electrically coupled to the first power controller and configured for obtaining the voltage signal from the first power controller;
   wherein when the second power controller obtains the voltage signal from the first power controller, the first power controller communicates with the second power controller under a communication protocol; and when the electronic device is required to be supplied power, the second power controller outputs a power request signal to the first power controller, the first power controller outputs a first voltage or a second voltage to the second power controller according to the communication protocol, and the second power controller outputs the first voltage or the second voltage to supply power for the electronic device.

2. The power control system of claim 1, wherein the power supply device comprises a first connector, the electronic device comprises a second connector, and the first power controller is electrically coupled to the second power controller through the first connector and the second connector.

3. The power control system claim 2, wherein the power supply obtains an alternating current (AC) power from an AC power supply, and outputs a work voltage to the first power controller according to the AC power transmitted from the AC power supply; the first power controller outputs the voltage signal to the second power controller according to the work voltage outputted by the power supply; and when the second power controller obtains the voltage signal from the first power controller, the first power controller communicates with the second power controller under the communication protocol.

4. The power control system of claim 3, wherein the electronic device further comprises a platform controller hub (PCH) chip and a switch, the switch is electrically coupled to the PCH chip to output a switch control signal to the PCH chip, the PCH chip obtains the switch control signal from the switch, and outputs a boot control signal to the second power controller according to the switch control signal outputted by the switch; and the second power controller outputs the power request signal to the first power controller according to the boot control signal outputted by the PCH chip, the first power controller outputs the first voltage or the second voltage to the second power controller according to the communication protocol, and the second power controller outputs the first voltage or the second voltage to supply power for the electronic device.

5. The power control system of claim 4, wherein the power supply device further comprises an electronic switch and a voltage conversion chip, both the voltage conversion chip and the electronic switch are electrically coupled between the power supply and the first power controller; and when the first power controller obtains the power request signal from the second power controller, the first power controller outputs a trigger signal to turn on the electronic switch, and the electronic switch outputs a power control signal to the power supply; and the power supply outputs the first voltage to the voltage conversion chip and the first power controller, the voltage conversion chip converts the first voltage to the second voltage, and transmits the second voltage to the first power controller.

6. The power control system of claim 5, wherein a power supply first voltage pin is electrically coupled to a first power controller first voltage pin, and the power supply first voltage pin is also electrically coupled to a voltage conversion chip voltage input pin; a power supply second voltage pin is electrically coupled to a first power controller second voltage pin; a voltage conversion chip voltage output pin is electrically coupled to a first power controller third voltage pin; a power supply power signal pin is electrically coupled to an electronic switch first terminal, an electronic switch second terminal is grounded, and an electronic switch third terminal is electrically coupled to a first power controller signal output pin; a first power controller voltage output pin is electrically coupled to a first connector power pin; and a first power controller first communication pin and a first power controller second communication pin are electrically coupled respectively to a first connector first communication pin and a first connector second communication pin.

7. The power control system of claim 6, wherein the electronic switch is a field effect transistor (FET).

8. The power control system of claim 7, wherein the electronic switch first terminal is a FET drain, the electronic switch second terminal is a FET source, and the electronic switch third terminal is a FET gate.

9. The power control system of claim 6, wherein the power supply is an advanced technology extended (ATX) power supply.

10. The power control system of claim 6, wherein both the first connector and the second connector are a Type-C connector.

11. A power control system comprising:
a power supply device comprising:
 a first connector;
 a power supply configured to supply power for a graphics card; and
 a first power controller configured to output a voltage signal; and
an electronic device comprising:
 a second connector electrically coupled to the first connector; and
 a second power controller electrically coupled to the first power controller and configured for obtaining the voltage signal from the first power controller;
wherein the first power controller is electrically coupled to the second power controller through the first connector and the second connector; when the second power controller obtains the voltage signal from the first power controller, the first power controller communicates with the second power controller under a communication protocol; and when the electronic device is required to be supplied power, the second power controller outputs a power request signal to the first power controller, the first power controller outputs a first voltage or a second voltage to the second power controller according to the communication protocol, and the second power controller outputs the first voltage or the second voltage to supply power for the electronic device.

12. The power control system claim 11, wherein the power supply obtains an alternating current (AC) power from an AC power supply, and outputs a work voltage to the first power controller according to the AC power transmitted from the AC power supply; the first power controller outputs the voltage signal to the second power controller according to the work voltage outputted by the power supply; and when the second power controller obtains the voltage signal from the first power controller, the first power controller communicates with the second power controller under the communication protocol.

13. The power control system of claim 12, wherein the electronic device further comprises a platform controller hub (PCH) chip and a switch, the switch is electrically coupled to the PCH chip to output a switch control signal to the PCH chip, the PCH chip obtains the switch control signal from the switch, and outputs a boot control signal to the second power controller according to the switch control signal outputted by the switch; and the second power controller outputs the power request signal to the first power controller according to the boot control signal outputted by the PCH chip, the first power controller outputs the first voltage or the second voltage to the second power controller according to the communication protocol, and the second power controller outputs the first voltage or the second voltage to supply power for the electronic device.

14. The power control system of claim 13, wherein the power supply device further comprises an electronic switch and a voltage conversion chip, both the voltage conversion chip and the electronic switch are electrically coupled between the power supply and the first power controller; and when the first power controller obtains the power request signal from the second power controller, the first power controller outputs a trigger signal to turn on the electronic switch, and the electronic switch outputs a power control signal to the power supply; the power supply outputs the first voltage to the voltage conversion chip and the first power controller, the voltage conversion chip converts the first voltage to the second voltage, and transmits the second voltage to the first power controller.

15. The power control system of claim 14, wherein a power supply first voltage pin is electrically coupled to a first power controller first voltage pin, and the power supply first voltage pin is also electrically coupled to a voltage conversion chip voltage input pin; a power supply second voltage pin is electrically coupled to a first power controller second voltage pin; a voltage conversion chip voltage output pin is electrically coupled to a first power controller third voltage pin; a power supply power signal pin is electrically coupled to an electronic switch first terminal, an electronic switch second terminal is grounded, and an electronic switch third terminal is electrically coupled to a first power controller signal output pin; a first power controller voltage output pin is electrically coupled to a first connector power pin; and a first power controller first communication pin and a first power controller second communication pin are electrically coupled respectively to a first connector first communication pin and a first connector second communication pin.

16. The power control system of claim 14, wherein the electronic switch is a field effect transistor (FET).

17. The power control system of claim 15, wherein the electronic switch first terminal is a FET drain, the electronic switch second terminal is a FET source, and the electronic switch third terminal is a FET gate.

18. The power control system of claim 14, wherein the power supply is an advanced technology extended (ATX) power supply.

19. The power control system of claim 14, wherein both the first connector and the second connector are a Type-C connector.

* * * * *

UNITED STATES PATENT AND TRADEMARK OFFICE
CERTIFICATE OF CORRECTION

PATENT NO. : 9,952,640 B2
APPLICATION NO. : 15/248926
DATED : April 24, 2018
INVENTOR(S) : Jie Min and Chun-Sheng Chen Page 1 of 1

It is certified that error appears in the above-identified patent and that said Letters Patent is hereby corrected as shown below:

On the Title Page

Please replace Item (73) regarding "Assignees" with the following:
(73) Assignees: HONG FU JIN PRECISION INDUSTRY (Wuhan) CO., LTD., Wuhan (CN);
HON HAI PRECISION INDUSTRY CO., LTD., New Taipei (TW)

Signed and Sealed this
Eleventh Day of December, 2018

Andrei Iancu
*Director of the United States Patent and Trademark Office*